United States Patent [19]

Chang

[11] Patent Number: 4,980,884
[45] Date of Patent: Dec. 25, 1990

[54] PULSE DURATION DIGITAL MULTIPLEXING SYSTEM WITH PROGRESSIVELY INCREMENTED PULSE LENGTHS

[75] Inventor: Paul S. Chang, Harrisburg, Pa.

[73] Assignee: AMP Incorporated, Harrisburg, Pa.

[21] Appl. No.: 467,477

[22] Filed: Jan. 19, 1990

[51] Int. Cl.$^5$ .............................................. H04J 15/00
[52] U.S. Cl. ...................................... 370/9; 370/119; 375/22
[58] Field of Search ...................... 370/9, 119; 375/22

[56] References Cited

U.S. PATENT DOCUMENTS

| | | | |
|---|---|---|---|
| 4,345,323 | 8/1982 | Chang | 370/9 |
| 4,584,691 | 4/1986 | Herr | 375/22 |
| 4,608,630 | 8/1986 | Schott | 375/22 |
| 4,731,781 | 3/1988 | Nakamura | 370/9 |

*Primary Examiner*—Douglas W. Olms
*Assistant Examiner*—Christopher O. Edwards

[57] ABSTRACT

A pulse duration multiplexing communication system wherein the data pulse durations are defined as a function of the system clock tolerance. This results in no overlapping of data pulse durations for any local clock operating within the tolerance range.

6 Claims, 5 Drawing Sheets

PULSE DURATION DIGITAL MULTIPLEXING SYSTEM WITH PROGRESSIVELY INCREMENTED PULSE LENGTHS

BACKGROUND OF THE INVENTION

This invention relates to communication systems and, more particularly, to a pulse duration multiplexing communication system. In my earlier U.S. Pat. No. 4,345,323, the disclosure of which is hereby incorporated by reference herein, I disclose a system and a method for the multiplexing of digital data to enable simultaneous transmission/reception of a number of digital signals over a single communication channel. A plurality of input signals are clocked in and assigned respective binary coded weighted values. The combined binary coded weighted value of the input signals determines the time duration of a digital data pulse which is generated by the system. The multiplexed data is thereby represented by the length, or duration, of the generated pulse. This data pulse is then transmitted to a receiver, where it is amplified and quantized to a digital level and output signals are generated in correspondence to the digital transmitter input signals.

In a system of the type disclosed in the referenced patent, if a low tolerance, high accuracy, clock pulse generator, such as a crystal oscillator, is used at both the transmitter and the receiver, there is no problem with encoding and decoding the pulse durations. However, if the clock pulse generators at the transmitter and at the receiver operate at different frequencies, errors in decoding received pulses can occur. In a system of the type disclosed in U.S. Pat. No. 4,682,168, where there is a relatively complex central unit, or system controller, along with a plurality of relatively simple remote units, all interconnected via a data bus and clock bus, it may be economically feasible to utilize a precise crystal oscillator as part of the clock pulse generator in the central unit. However, the circuitry within each of the remote units is preferably incorporated within an application specific integrated circuit (ASIC), and the use of a crystal oscillator in conjunction therewith is inconvenient and not cost effective. Unfortunately, oscillators available in an ASIC are not very accurate. Therefore, the transmitter and receiver may not be operating at the same frequency.

Accordingly, it is a primary object of this invention to provide a pulse duration multiplexing system and a method for use therein which provides reliable signal decoding even with the use of clock pulse generators having a relatively large tolerance in their accuracy without the need for a clock bus.

SUMMARY OF THE INVENTION

The foregoing, and additional, objects are attained in accordance with the principles of this invention in a communication system including a central unit, a plurality of remote units, bus means interconnecting the central and remote units for communication therebetween, a central data pulse duration digital multiplexing transceiver coupled to the bus means at the central unit, and a plurality of respective remote data pulse duration digital multiplexing transceivers coupled to the bus means one at each of the remote units, the central transceiver having an accurate fixed frequency clock pulse generator and each of the remote transceivers having a respective fixed frequency clock pulse generator, each of the remote clock pulse generators operating at a frequency which is within a predetermined tolerance range of the accurate fixed frequency, by providing means at each of the transceivers for defining each data pulse duration so that for any remote clock pulse generator frequency within the predetermined tolerance range there is no overlap of each data pulse duration with an equivalent data pulse duration representing data different from that represented by each data pulse duration and due to any other remote clock pulse generator frequency within the predetermined tolerance range.

In accordance with an aspect of this invention, there is also provided means at each of the transceivers for generating a plurality of decoding strobe signals each corresponding to a respective data pulse duration, including means for defining the time of each strobe signal so that for any clock pulse generator frequency within the predetermined tolerance range each of the strobe signals will occur during its respective data pulse duration and longer data pulse durations but not during shorter data pulse durations.

BRIEF DESCRIPTION OF THE DRAWINGS

The foregoing will be more readily apparent upon reading the following description in conjunction with the drawings in which like elements in different figures thereof have the same reference numeral applied thereto and wherein.

DETAILED DESCRIPTION

Figure 1:
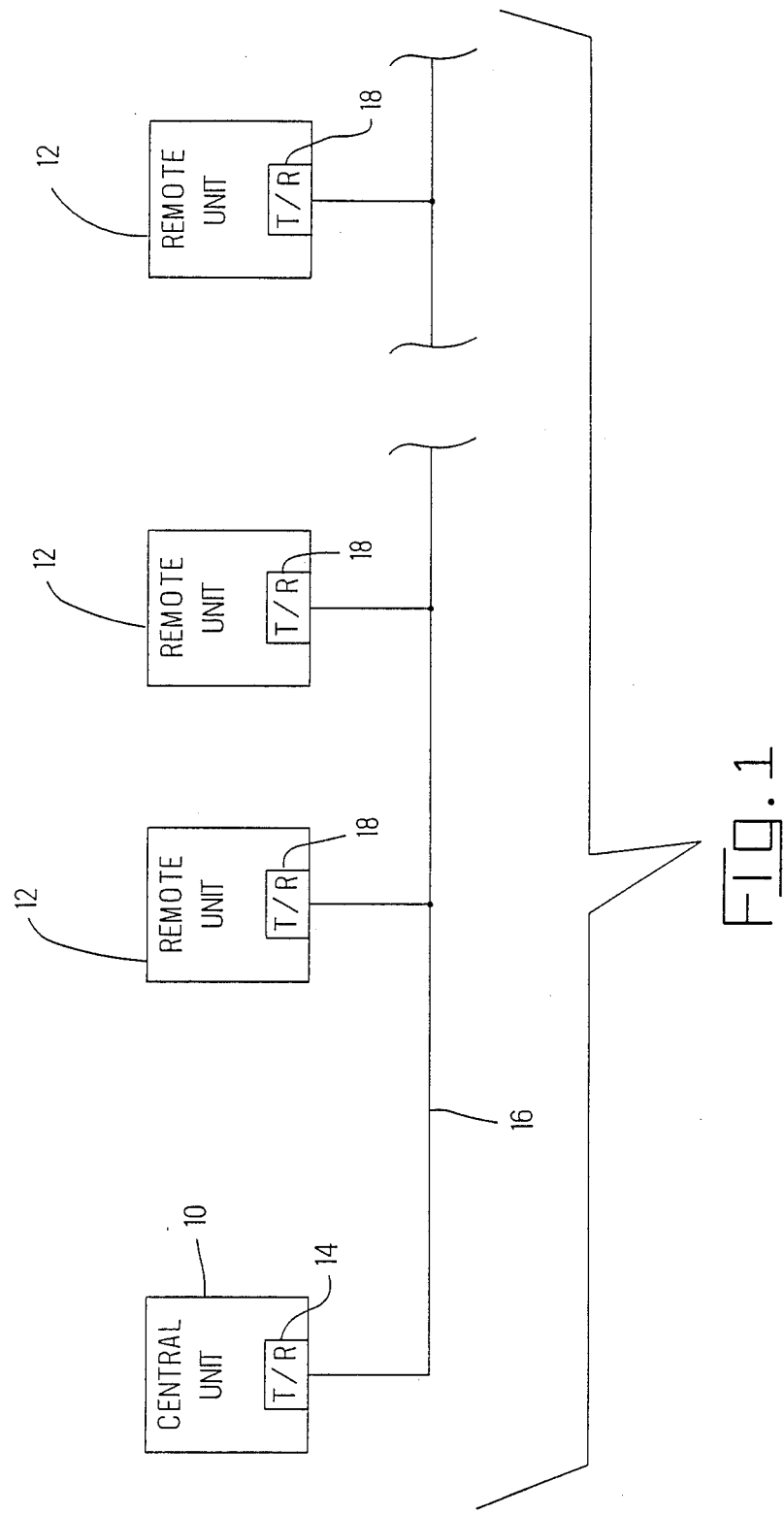
FIG. 1 is a generalized block diagram showing a communication system of the type in which the present invention may be incorporated.

FIG. 1 illustrates a system in which the present invention may be incorporated. The system shown in FIG. 1 includes a central unit 10 and a plurality of remote units 12. The central unit 10 includes a transceiver (T/R) 14 coupled to a bus 16 and each of the remote units 12 also includes a respective transceiver 18 coupled to the bus 16. Thus, communication between the central unit 10 and the remote units 12 can be effected by means of the transceivers 14, 18 and the bus 16. The transceivers 14, 18 include pulse duration multiplexers which utilize a single pulse to represent two digital bits of data. (For purposes of illustration, only two bits are considered herein. However, it is understood that three or more bits of data may also be represented, as taught by the referenced patent No. 4,345,323.) To aid in an understanding of the present invention, the technique of pulse duration multiplexing will be briefly reviewed.

In a pulse duration multiplexing system, the multiplexer generates a pulse according to the data bits. Thus, for a multiplexing factor of two (2), to represent data bit pairs of 00, 01, 10 and 11, the pulses are of lengths L, 2L, 3L and 4L, respectively. In the demultiplexing process, the received data pulse is first clocked in by the local oscillator, illustratively through a D-type flip flop. If the data pulse is not an exact integer multiple of the local clock period, the output from the flip flop will have a length equal to nt or $(n+1)t$, where t is the local clock period. A local receiving clock faster than the transmitting clock will see a data pulse duration longer than the expected value. Conversely, a slower local receiving clock will see a shorter data pulse duration. Assuming a local clock where $L=4t$, the measured values of transmitted pulses of duration L, 2L, 3L and 4L are in the ranges $(3-5)t$, $(7-9)t$, $(11-13)t$ and $(15-17)t$, respectively. In this case, the strobing, or sampling, for detection purposes takes place at 2t, 6t, 10t and 14t. The maximum tolerance of the local oscillator frequency accuracy in this case is $\pm(1/16)=\pm 6.25\%$.

If the frequency of the local clock is increased, for example such that $L=16t$, it can be shown that the tolerance can be doubled to $\pm 12.5\%$. However, further increases in clock rate give diminishing returns. It can be shown that the absolute limit of tolerance at an extremely high clock frequency can never exceed $\pm 1/7 = \pm 14.28\%$.

According to the present invention, in order to allow the use of a local clock having a greater frequency tolerance, the data pulse durations are not assigned in the fixed ratios of 1, 2, 3 and 4, but rather are fixed according to the particular tolerance of the local clock at the remote units. This presumes that an accurate clock, such as a crystal oscillator clock, is utilized at the central unit. When using an application specific integrated circuit, the chip manufacturer specifies the tolerance of the in-chip oscillator. Assuming that the tolerance is $\pm 25\%$ or less, the pulse duration lengths may then be determined. In the following discussion, all references to time will be in terms of clock pulses, where t=the local clock period. Since as previously discussed, the first decoding strobing signal is to take place at $S_1=2t$, we wish to insure that the shortest, or first, data pulse is at least three clock pulses long. If the local clock at the remote units has a tolerance range of $\pm 25\%$ of the accurate frequency of the clock at the central unit, then the minimum value of $P_1=4t$, where $P_1$ is the duration of the shortest data pulse, since with a tolerance range of $\pm 25\%$ this means that the data pulse duration will always be at least as great as 3t, which is what is desired. This results in a maximum data pulse duration of 5t for the shortest data pulse.

Figure 2:
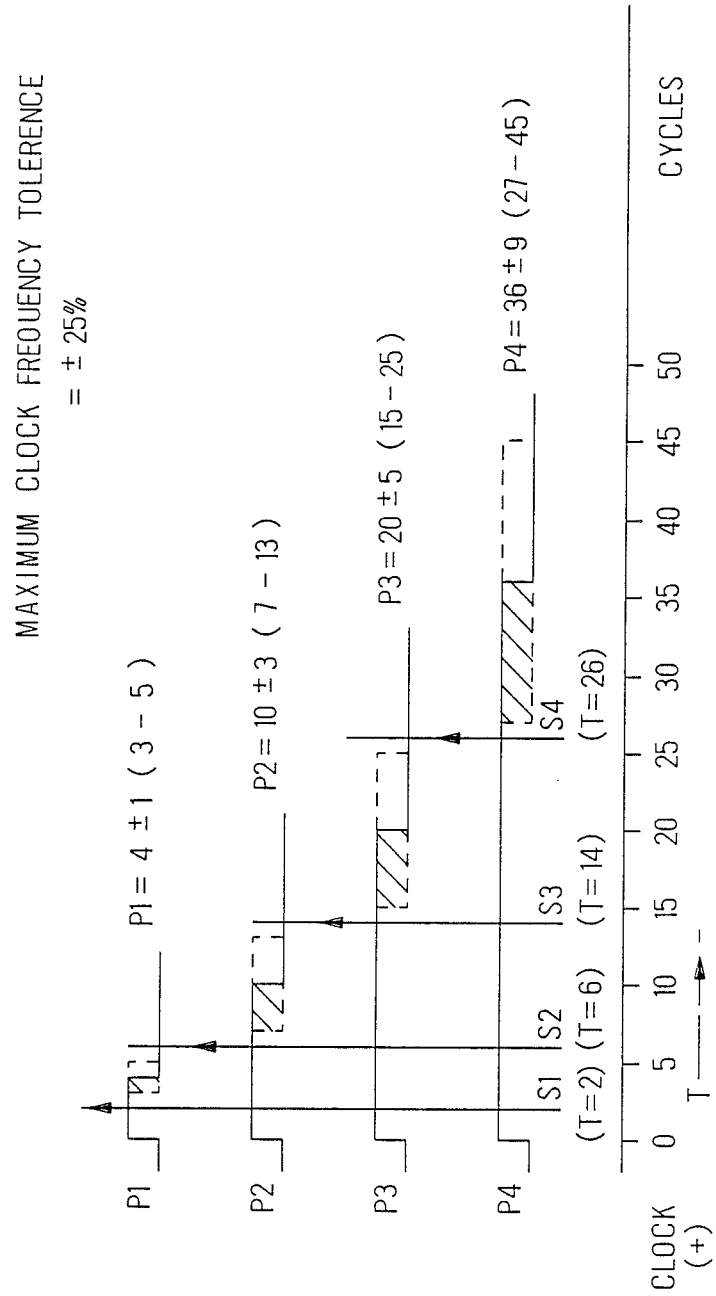
FIGS. 2 and 3 are timing diagrams of the pulses generated in accordance with this invention for a two channel multiplexer system, showing the pulses for different frequency tolerances.

To allow a strobing signal to occur after the longest duration of $P_1$ and before the shortest duration of $P_2$, adding two clock times to $P_{1max}$, one can calculate that $P_{2min}=7t$. Therefore, the time for the second strobing signal $S_2=(P_{1max}+1)=(P_{2min}-1)=6t$. Since the value of $P_{2min}$ has been obtained, the nominal value of the second data pulse duration $P_2=P_{2min}/(1-0.25)=7t/0.75=9.33t$. Since we are dealing with integer numbers of clock pulses, the duration of the second data pulse is taken to be $P_2=10t$. Accordingly, $P_{2max}=P2(1+0.25)=12.5t$. Again, taking the integer number we arrive at $P_{2max}=13t$. Continuing with the calculations, we can obtain $P_{3min}=13t+2t=15t$; $P_3=15t/(1-0.25)=20t$; and $P_{3max}=20t$ $(1+0.25)=25t$. Similarly, $P_{4min}=27t$; $P_4=36t$; and $P_{4max}=45t$. The corresponding strobing times are $S_3=14t$ and $S_4=36t$. These results are shown in FIG. 2.

Figure 3:
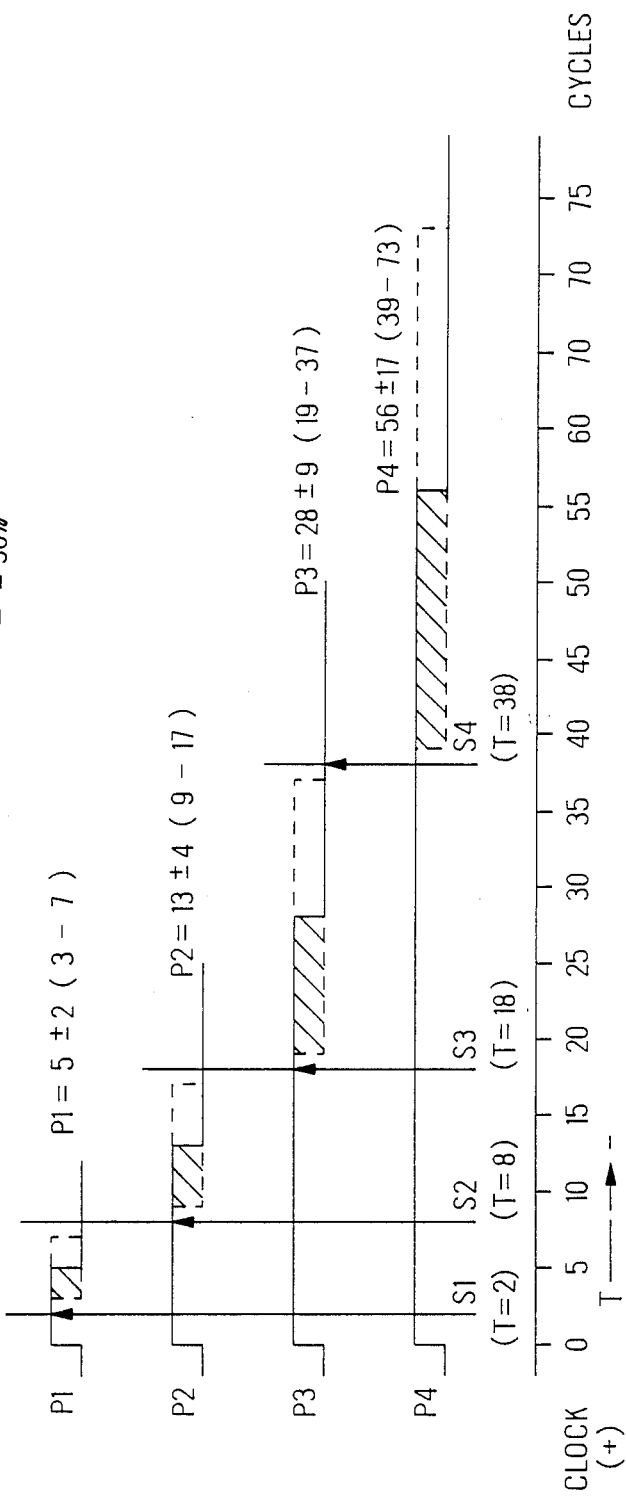

If the in-chip oscillator has a higher frequency tolerance, for example $\pm 30\%$, the first data pulse duration must be chosen to allow the strobing signal $S_1=2t$, and therefore $P_1$ is chosen to be equal to 5t. Performing similar calculations as above, the different data pulse durations are found to be $P_1=5t\pm 2t$; $P_2=13t\pm 4t$; $P_3=28t\pm 9t$; and $P_4=56t\pm 17t$. The corresponding strobing times are calculated to be $S_1=2t$; $S_2=8t$; $S_3=18t$; and $S_4=38t$. These results are shown in FIG. 3.

The foregoing results may be generalized as follows. With a remote clock pulse generator frequency within a tolerance range T, which is a fraction of the accurate fixed frequency of the central unit clock, the first data pulse duration $P_1$ is defined as an integer number of clock pulses such that $P_1 \geq 3(1+T)$. Each subsequent nth data pulse duration $P_n$ is then defined as the lowest integer number of clock pulses that satisfies the relationship $$P_n \geq \frac{P_{n-1}(1+T)+2}{(1-T)}.$$

Similarly, the time of the strobe signal $S_1$ for the first data pulse duration is defined to be two clock pulses after the start of each data pulse and the time of the strobe signal for the nth data pulse duration $S_n$ is defined to be the lowest integer number of clock pulses after the start of each data pulse that satisfies the relationship $S_n \geq P_{n-1}(1+T)+1$.

Figure 4:
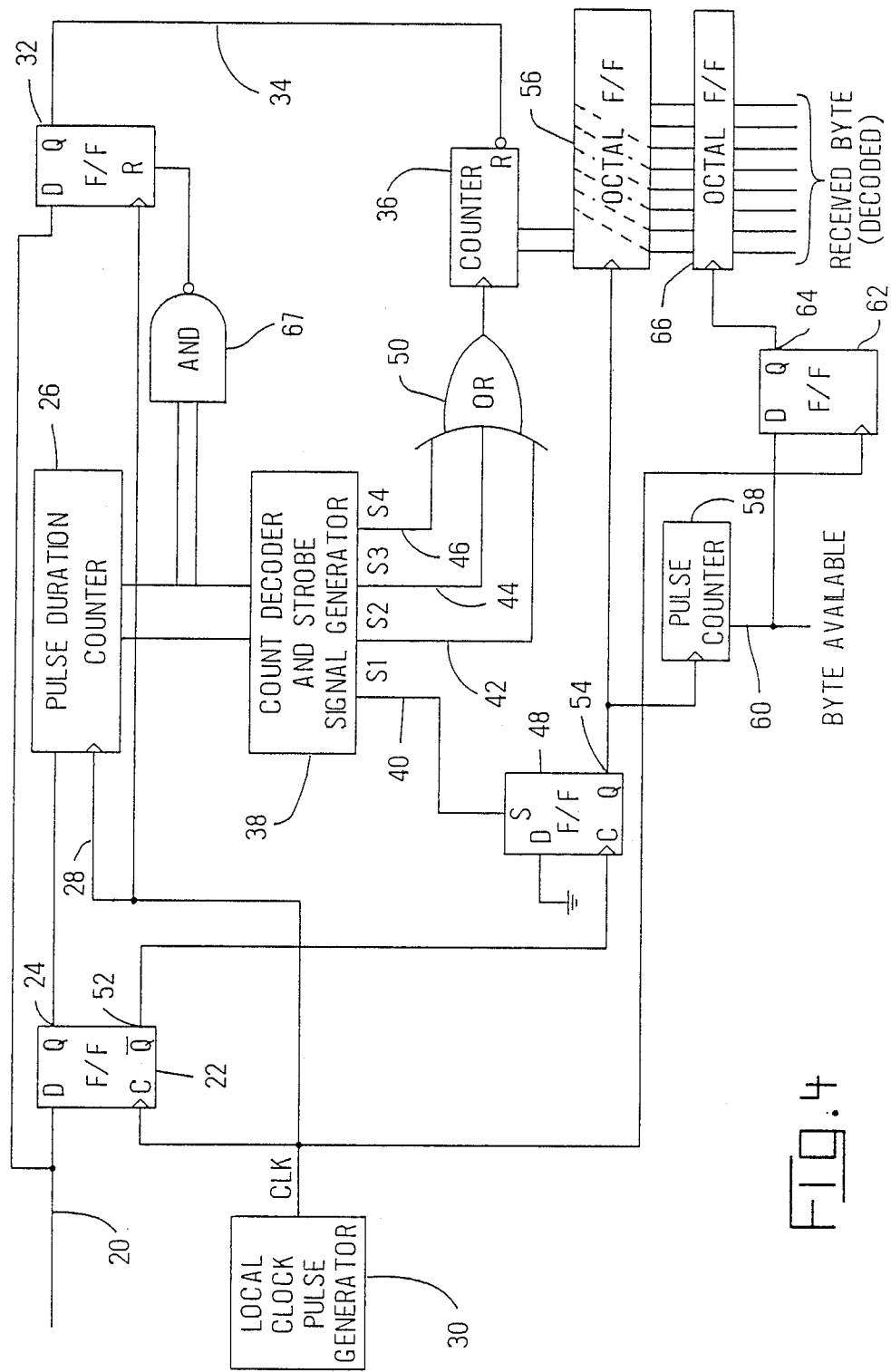
FIG. 4 is a logic block diagram showing a decoder/demultiplexer according to this invention.

FIG. 4 illustrates a logic block diagram showing a decoder/demultiplexer according to this invention for a multiplexing factor of two (2). The input data pulse is received over the input line 20 and is clocked through a D-type flip flop 22. The Q output 24 of the flip flop 22 enables the pulse duration counter 26 to start counting clock pulses on the line 28 which are generated by the local clock pulse generator 30. For purposes of the present discussion, it will be assumed that the described system has a local clock frequency tolerance of $\pm 25\%$. Thus, the circuitry shown in FIG. 4 is incorporated in the transceivers 14 and 18. In the case of the transceiver 14, the clock pulse generator 30 includes an accurate fixed frequency crystal oscillator. In the case of the transceivers 18, the local clock pulse generator 30 includes a fixed frequency clock operating within a tolerance range of $\pm 25\%$ of the frequency of the clock incorporated in the transceiver 14.

At the same time that the counter 26 is enabled, the pulse on the input line 20 turns on the flip flop 32 whose Q output on the lead 34 unresets the counter 36. The counter decoder and strobe signal generator circuit 38 has its inputs coupled to the outputs of the pulse duration counter 26 and is arranged to generate the strobe signals $S_1$–$S_4$ on the leads 40, 42, 44 and 46, respectively, at the appropriate times. Thus, in a system where the local clock tolerance is $\pm 25\%$ the circuit 38 will generate a strobe signal on the lead 40 when the counter 26 reaches a count of 2; will generate a strobe signal on the lead 42 when the counter 26 reaches a count of 6; will generate a strobe signal on the lead 44 when the counter 26 reaches a count of 14; and will generate a strobe signal on the lead 46 when the counter 26 reaches a count of 26. Similarly, when the system is designed for a local clock having a tolerance of ±30%, the circuit 38 is arranged to generate a strobe signal on the lead 40 when the counter 26 reaches a count of 2 to generate a strobe signal on the lead 42 when the counter 26 reaches a count of 8; to generate a strobe signal on the lead 44 when the counter 26 reaches a count of 18; and to generate a strobe signal on the lead 46 when the counter 26 reaches a count of 38.

For purposes of illustration, it will be assumed that the system is designed for a clock tolerance of ±25% and that a data pulse like $P_3$ (FIG. 2) is received on the input line 20. When the counter 26 reaches the count of 2, the strobe signal $S_1$ on the lead 40 presets the flip flop 48. Then, as the count continues and reaches a count of 6, the strobe signal $S_2$ on the lead 42 passes through the OR gate 50 to cause the counter 36 to count to one (1). Next, the counter 26 will reach a count of 14, since the input pulse is $P_3$, and the strobe signal $S_3$ will be generated on the lead 44 which will cause the counter 36 to be incremented to two (2). At a count of somewhere between 15 and 25, depending upon whether the local clock 30 is faster or slower than the clock at the data pulse generating transceiver, the signal on the input line 20 will go low, causing the Q output 24 of the flip flop 22 to go low. This will result in the $\overline{Q}$ output 52 of the flip flop 22 going high. When the $\overline{Q}$ output 52 goes high, this clears the flip flop 48 and causes its $\overline{Q}$ output 54 to go high, which results in the contents of the counter 36 being stored in the first two stages of the octal flip flop 56 and also causes the pulse counter 58 to be incremented to indicate that one data pulse has been received. For purposes of this discussion, it will be assumed that a data byte comprises eight bits which equates to four data pulses.

The clearing of the flip flop 22 also disables the pulse duration counter 26 and, on the next clock pulse, clears the flip flop 48 to allow it to start afresh for the next incoming data pulse on the input line 20.

Since the counter 36 had reached a count of two, the binary number 10 is stored in the first pair of stages of the flip flop 56. When the next pulse is received on the input line 20, the foregoing process is repeated, with the count corresponding to that pulse being stored in the counter 36. When that data pulse ends, the contents of the counter 36 are stored in the first pair of stages of the octal flip flop 56, while the previous contents of that first pair of stages is shifted to the second pair of stages. The pulse counter 58 is also incremented.

After four data pulses are received on the input line 20, the data pulse counter 58 provides a high output on the lead 60. This causes the flip flop 62 to be set upon the occurrence of the next clock pulse, providing a high signal at its Q output 64. A high signal at the Q output 64 of the flip flop 62 causes the eight bits stored in the octal flip flop 56 to be loaded into the octal flip flop 66. The high signal on the lead 60 indicates to the remainder of the system that a byte is available, this byte being provided on the output leads of the octal flip flop 66. When the received byte data is read by the remainder of the system, the flip flop 48 and the data pulse counter 58 are cleared. Such handshaking does not form a part of the present invention and many conventional ways are available for this purpose.

The gate 67 is coupled to the outputs of the counter 26 so that if an input pulse is received that is longer than the allowable maximum duration for a data pulse, the flip flop 32 is reset. Since $P_{4max}=45t$, the gate 67 is arranged to reset the flip flop 32 upon sensing a count of forty six.

Figure 5:
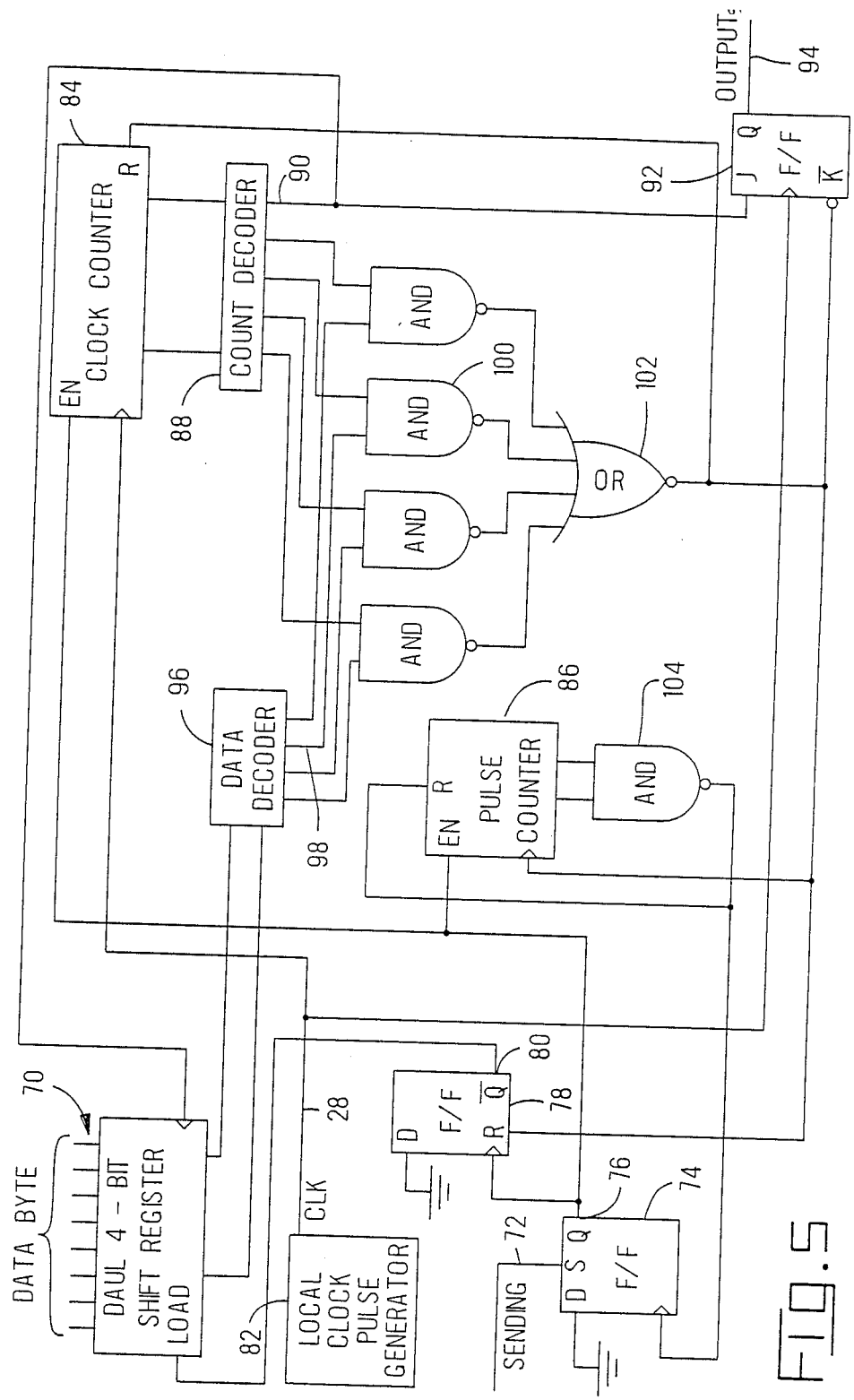
FIG. 5 is a logic block diagram showing an encoder/multiplexer according to this invention.

FIG. 5 illustrates circuitry for generating the data pulses. Again, it is assumed that this circuitry is part of a system wherein the clock has a tolerance range of ±25%. When it is desired to generate and transmit data pulses corresponding to an 8 bit data byte provided on the input lines 70, the system provides an enable sending signal on the lead 72 which sets the flip flop 74, causing its Q output 76 to go high. When the Q output 76 of the flip flop 74 goes high, it clocks the flip flop 78, causing its $\overline{Q}$ output 80 to go high, which in turn results in the dual 4-bit shift register 82 being placed in its load mode. The Q output 76 of the flip flop 74 being high also enables the clock counter 84 and the pulse counter 86.

With the clock counter 84 enabled, it starts counting clock pulses on the lead 28 from the local clock pulse generator 30. The outputs of the clock counter 84 are provided as inputs to the count decoder 88. When the counter 84 reaches a count of three (3), the decoder 88 output on the lead 90 goes high, causing the J input of the flip flop 92 to be high. Accordingly, upon the next occurrence of a clock pulse on the lead 28, the Q output of the flip flop 92 goes high to commence providing an output data pulse on the lead 94. The high signal on the lead 90 also serves to cause the loading of the eight bits of data on the leads 70 into the shift register 82, which had previously been set into the load mode by the $\overline{Q}$ output 80 of the flip flop 78. The contents of the first two stages of the shift register 82 are decoded by the data decoder 96 which determines which of its four output lines should go high. Assuming that the data pair is binary 01, then the lead 98 goes high. Therefore, at a clock count of 13, the AND gate 100 is enabled, sending a signal through the gate 102 to cause the flip flop 92 to be reset at the next clock pulse, terminating the output data pulse on the lead 94. The output of the gate 102 also resets the clock counter 84, increments the pulse counter 86 and resets the flip flop 78. Resetting the flip flop 78 changes the state of the shift register 82 from parallel load to serial shift.

After having been reset to zero, the clock counter 84 counts up again until it reaches the count of three (3). The output 90 of the count decoder 88 again causes an output pulse on the lead 94 to commence and at the same time causes the next data pair in the shift register 82 to be shifted and applied as inputs to the data decoder 96. The generation of the data pulse proceeds as previously described. However, when the pulse counter 86 reaches a count of four (4), the gate 104 is enabled to reset the counter 86 and reset the flip flop 74. Resetting the flip flop 74 disables any further transmission until the flip flop 74 is reactivated by an enable sending pulse on the lead 72. Again, as described with regard to the decoding circuitry of FIG. 4, the handshaking procedures depend on the system arrangement, and may vary as needed, these procedures not forming a part of the present invention.

Although the circuitry of FIG. 5 was described for the case where the clock tolerance range is ±25%, other tolerance ranges are possible, with the only required changes being in the count decoder 88. Thus, for a tolerance range of ±30% (see FIG. 3) the relevant outputs of the count decoder 88 would correspond to clock counts of 3, 8, 16, 31, and 59, instead of 3, 7, 13, 23, and 39 as shown in FIG. 5.

Accordingly, there has been disclosed an improved pulse duration multiplexing communication system. While an illustrative embodiment of the present invention has been disclosed herein, it will be apparent to those of ordinary skill in the art that various modifications and adaptations to those embodiments are possible and it is only intended that the present invention be limited by the scope of the appended claims.

I claim:

1. A communication system including a central unit, a plurality of remote units, bus means interconnecting said central and remote units for communication therebetween, a central data pulse duration digital multiplexing transceiver coupled to said bus means at said central unit, and a plurality of respective remote data pulse duration digital multiplexing transceivers coupled to said bus means one at each of said remote units;

said central transceiver having an accurate fixed frequency clock pulse generator and each of said remote transceivers having a respective fixed frequency clock pulse generator, each of said remote clock pulse generators operating at a frequency which is within a predetermined tolerance range of said accurate fixed frequency;

wherein the improvement comprises means at each of said transceivers for defining each data pulse duration so that for any remote clock pulse generator frequency within said predetermined tolerance range there is no overlap of said each data pulse duration with an equivalent data pulse duration representing data different from that represented by said each data pulse duration and due to any other remote clock pulse generator frequency within said predetermined tolerance range.

2. The communication system according to claim 1 wherein the improvement further comprises means at each of said transceivers for generating a plurality of decoding strobe signals each corresponding to a respective data pulse duration, including means for defining the time of each strobe signal so that for any clock pulse generator frequency within said predetermined tolerance range each of said strobe signals will occur during its respective data pulse duration and longer data pulse durations but not during shorter data pulse durations.

3. The communication system according to claim 2 wherein for a tolerance range of ±25% and a multiplexing factor of two (2), said data pulse duration defining means includes means for generating data pulses having relative lengths of four (4), ten (10), twenty (20) and thirty six (36) clock pulses, and said strobe signal generating means includes means for generating strobe signals at two (2), six (6), fourteen (14) and twenty six (26) clock pulses after the start of each data pulse.

4. The communication system according to claim 2 wherein for a tolerance range of ±30% and a multiplexing factor of two (2), said data pulse duration defining means includes means for generating data pulses having relative lengths of five (5), thirteen (13), twenty eight (28) and fifty six (56) clock pulses, and said strobe signal generating means includes means for generating strobe signals at two (2), eight (8), eighteen (18) and thirty eight (38) clock pulses after the start of each data pulse.

5. In a communication system including a central unit, a plurality of remote units, bus means interconnecting said central and remote units for communication therebetween, a central data pulse duration digital multiplexing transceiver coupled to said bus means at said central unit, and a plurality of respective remote data pulse duration digital multiplexing transceivers coupled to said bus means one at each of said remote units;

said central transceiver having an accurate fixed frequency clock pulse generator and each of said remote transceivers having a respective fixed frequency clock pulse generator operating at a frequency which is within a predetermined tolerance range (T) of said accurate fixed frequency, where T is expressed as a fraction of said accurate fixed frequency;

a method for defining each data pulse duration (P) so that for any remote clock pulse generator frequency within said predetermined tolerance range there is no overlap of said each data pulse duration with an equivalent data pulse duration representing data different from that represented by said each data pulse duration and due to any other remote clock pulse generator frequency within said predetermined tolerance range, comprising the steps of:

(a) defining the first data pulse duration $P_1$ as an integral number of clock pulses such that $P_1 \geq 3(1+T)$; and (b) defining each subsequent nth data pulse duration $P_n$ as the lowest integral number of clock pulses that satisfies the relationship $$P_n \geq \frac{P_{n-1}(1+T)+2}{(1+T)}.$$

6. In a communication system according to claim 5 which further comprises means at each of said transceivers for generating a plurality of decoding strobe signals each corresponding to a respective data pulse duration, a further method for defining the time of each strobe signal so that for any clock pulse generator frequency within said predetermined tolerance range each of said strobe signals will occur during its respective data pulse duration and longer data pulse durations but not during shorter pulse durations, comprising the steps of:

(a) defining the time of the strobe signal $S_1$ for the first data pulse duration to be at two (2) clock pulses after the start of each data pulse; and (b) defining the time of the strobe signal for the nth data pulse duration $S_n$ to be the lowest integral number of clock pulses after the start of each data pulse that satisfies the relationship $S_n \geq P_{n-1}(1+T)+1.$

* * * * *